(12) United States Patent
Kline

(10) Patent No.: US 6,994,150 B1
(45) Date of Patent: Feb. 7, 2006

(54) ENGINE GUARD OIL COOLER

(76) Inventor: Steven C. Kline, 2232 Oaklawn Dr., Decatur, IL (US) 62526

( * ) Notice: Subject to any disclaimer, the term of this patent is extended or adjusted under 35 U.S.C. 154(b) by 0 days.

(21) Appl. No.: 11/092,433

(22) Filed: Mar. 29, 2005

Related U.S. Application Data

(60) Provisional application No. 60/558,662, filed on Mar. 31, 2004.

(51) Int. Cl.
  *F01M 1/06* (2006.01)
  *F01M 1/08* (2006.01)
  *F01M 5/00* (2006.01)
  *F01P 11/08* (2006.01)
  *B60K 11/04* (2006.01)

(52) U.S. Cl. ............................ 165/41; 165/51; 165/44; 165/109.1; 165/179; 165/916; 165/177; 180/68.4; 180/229; 180/68.1; 123/196 AB; 123/41.33; 184/104.3; 184/104.1; 138/38

(58) Field of Classification Search ................... 165/41, 165/133, 179, 177, 109.1, 44, 51, 916; 123/196 AB, 123/41.33; 138/38; 184/104.3, 104.1; 180/68.1, 180/68.4, 229
See application file for complete search history.

(56) References Cited

U.S. PATENT DOCUMENTS

| 2,806,676 A | * | 9/1957 | Meyer | 165/167 |
| 5,244,036 A | * | 9/1993 | Michl | 165/300 |
| 5,653,206 A | * | 8/1997 | Spurgin | 123/196 AB |

FOREIGN PATENT DOCUMENTS

JP          62007910 A   *   1/1987

\* cited by examiner

*Primary Examiner*—John K. Ford
(74) *Attorney, Agent, or Firm*—Philip L. Bateman

(57) ABSTRACT

An integrated engine guard oil cooler is mounted to a motorcycle. The cooler is a hollow tube having an inlet, an outlet, a plurality of cross-sectional restrictions in its interior, and a plurality of radial cooling fins on its exterior. The tube has a shape such that, when the inlet and the outlet are mounted on opposite sides of the lower frame of a motorcycle, the tube extends outwardly from each side of the frame, then extends upwardly, and then extends inwardly to join and form an enclosed passageway. When the inlet and the outlet communicate with the oil reservoir of the engine, oil flows through the tube with successive pressure increases and pressure decreases as it passes the cross-sectional restrictions and heat from the oil is transferred to the ambient air through the radial cooling fins.

2 Claims, 2 Drawing Sheets

ENGINE GUARD OIL COOLER

CROSS-REFERENCE TO RELATED APPLICATION

This application claims the benefit of U.S. Provisional Application Ser. No. 60/558,662, Mar. 31, 2004.

FIELD OF THE INVENTION

This invention relates to motorcycles. More particularly, this invention relates to oil coolers for motorcycle engines.

BACKGROUND OF THE INVENTION

Most motorcycle engines are air cooled—heat generated from the combustion of the gasoline is transferred directly to the ambient air. In hot weather under heavy loads, the temperature of the engine oil can exceed recommended limits. For this reason, auxiliary oil coolers are frequently added. Oil flows through the oil cooler and heat is transferred to the ambient air. Auxiliary oil coolers typically comprise a finned heat exchanger and are typically mounted near the bottom of the engine. Unfortunately, there are several disadvantages associated with mounting an auxiliary oil cooler at this location. First, an auxiliary oil cooler mounted near the bottom of the engine is prone to damage from road debris. Second, the oil cooler often gets caked with dirt and grime which greatly reduces its efficiency in cooling the oil. Third, air flow to the oil cooler is blocked by the front wheel. And fourth, the oil cooler blocks air flow to the engine.

Some motorcycles, including the HARLEY-DAVIDSON SOFTAIL, HERITAGE, ROAD KING, ULTRA CLASSIC, and ELECTRAGLIDE models, contain engine guards. Engine guards, also known as crash bars, are metal tubes that attach to the frame and extend outwardly in front of the engine. They help prevent damage to the engine and may also help prevent injury to the rider's legs in the event of an accident.

Motorcycles with engine guards have been modified by adding fittings that provide communication between the interior of the engine guard and the oil reservoir of the engine. As the oil flows through the engine guard, some additional cooling takes place as heat is transferred to the ambient air. The additional volume represented by the interior of the engine guard also helps to reduce the temperature of the oil.

An oil cooler adapter kit is sold by J & P Cycles of Anamosa, Iowa on its website at www.jpcycles.com. The installation of the kit is an involved procedure best performed by a professional mechanic. Once installed, the oil cooler adapter kit routes engine oil through the engine guard. The adapter kit includes a thermostat that regulates the flow. Routing engine oil through the engine guard has little effect on the oil pressure.

Accordingly, a demand exists for an integrated motorcycle engine guard oil cooler that creates successive pressure increases and pressure decreases and that provides improved cooling.

SUMMARY OF THE INVENTION

The general object of this invention is to provide an improved integrated motorcycle engine guard oil cooler.

I have invented an integrated motorcycle engine guard oil cooler. The cooler comprises a hollow metal tube having an inlet, an outlet, a plurality of cross-sectional restrictions in its interior, and a plurality of radial cooling fins on its exterior. The tube has a shape such that, when the inlet and the outlet are mounted on opposite sides of the lower frame of a motorcycle, the tube extends outwardly from each side of the frame, then extends upwardly, and then extends inwardly to join and form an enclosed passageway. When the inlet and the outlet communicate with the oil reservoir of the engine, oil flows through the tube with successive pressure increases and pressure decreases as it passes the cross-sectional restrictions and heat from the oil is transferred to the ambient air through the radial cooling fins.

The successive pressure increases and pressure decreases create additional oil pressure and improves cooling. The radial cooling fins also provide improved cooling. Furthermore, the oil cooler is located to receive maximum air flow and to minimize the obstruction of air flow to the engine.

DETAILED DESCRIPTION OF THE INVENTION

Figure 1:
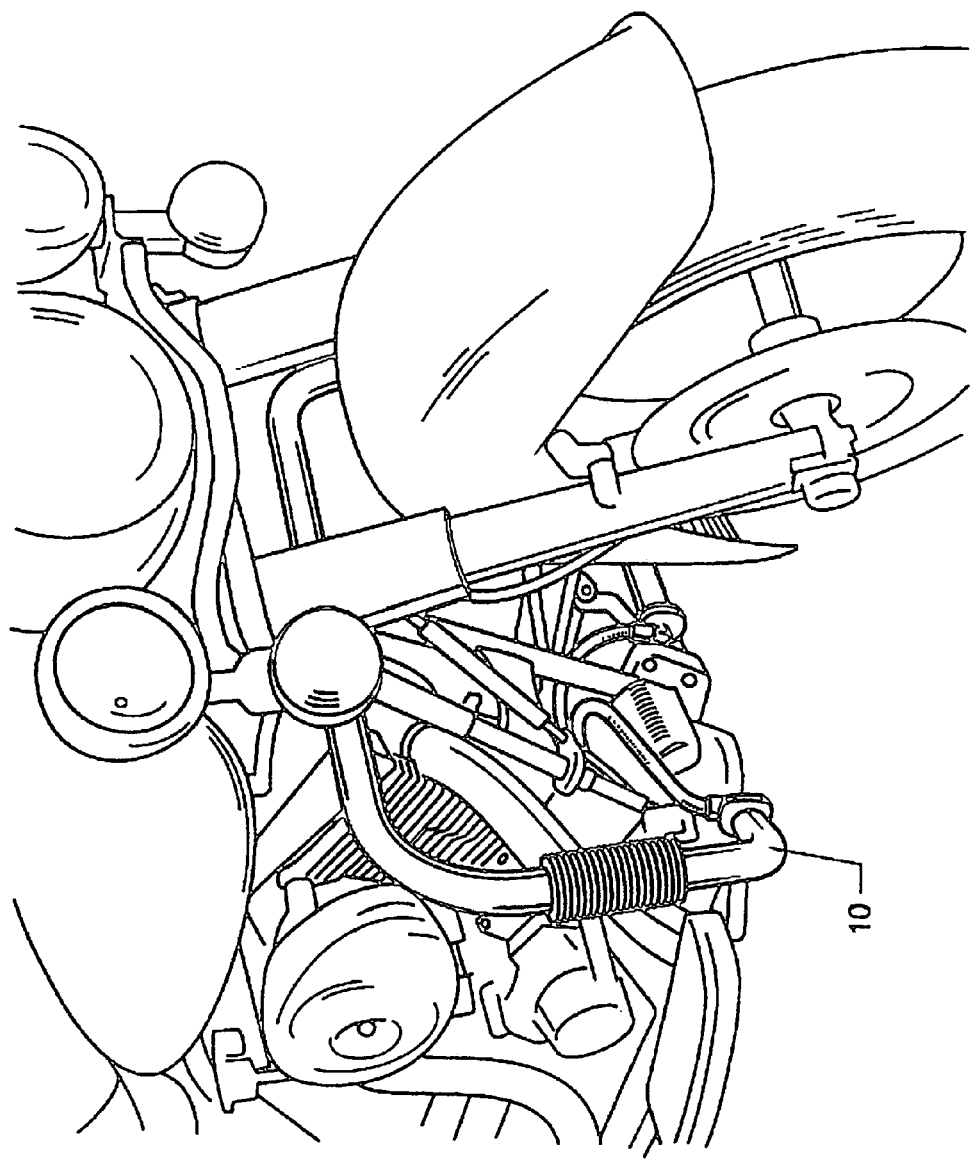
FIG. 1 is a perspective view of a preferred embodiment of the motorcycle engine guard oil cooler of this invention installed on a motorcycle.

This invention is best understood by reference to the drawings. The integrated engine guard oil cooler 10 of this invention is shown installed on a motorcycle in FIG. 1. The cooler is made of metal, preferably steel or aluminum, because of metal's durability and its conductivity of heat. The preferred integrated engine guard oil cooler is made of 1018 steel and is finished in black powder coat. Other finishes, such as chrome, are also suitable.

Figure 2:
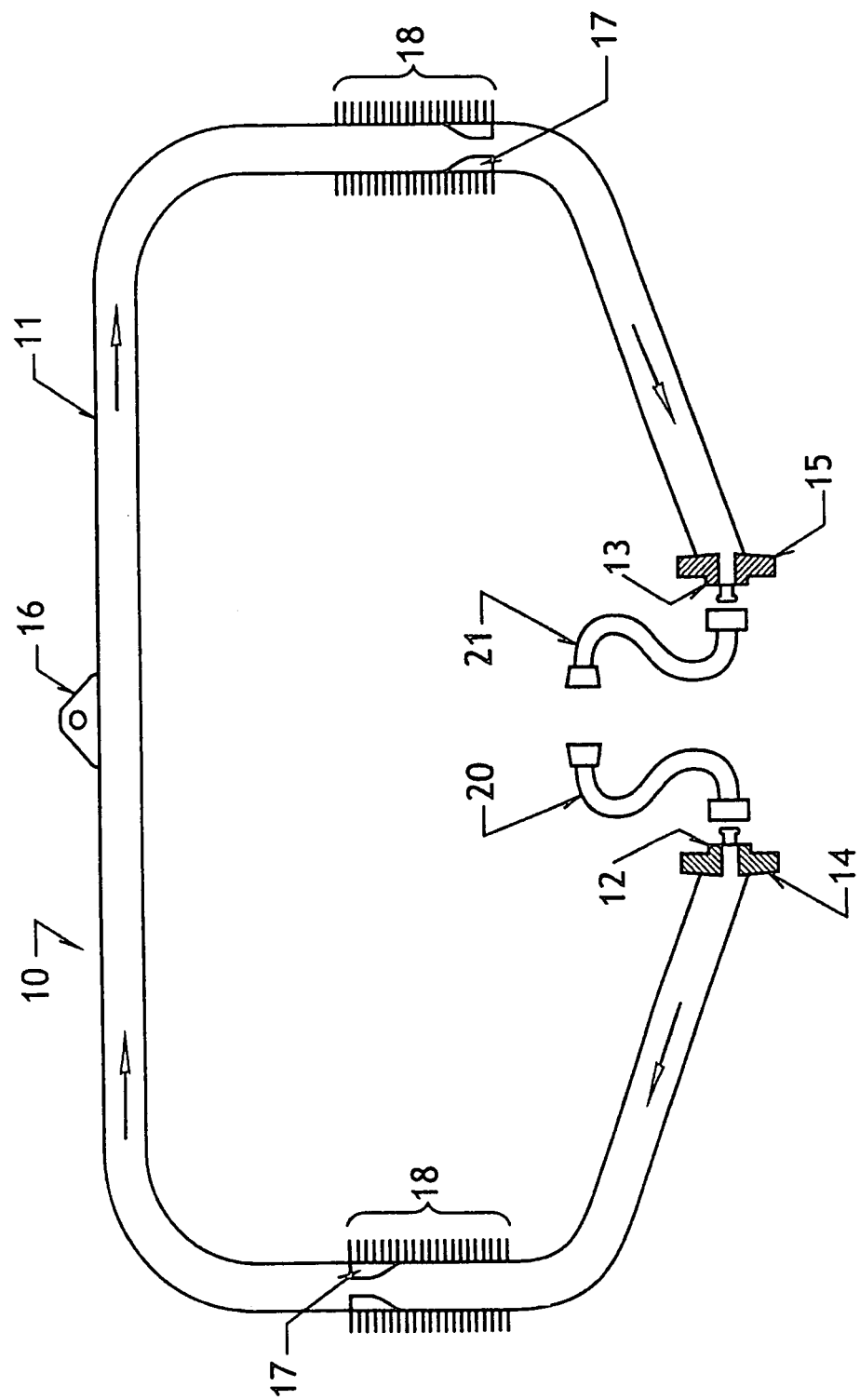
FIG. 2 is a sectional view thereof.

Referring now to FIG. 2, the engine guard oil cooler is a hollow metal tube 11 having an inlet 12 and an outlet 13. Flanges 14 and 15 contain holes for mounting the engine guard oil cooler onto the lower frame of a motorcycle. A top bracket 16 contains a hole for mounting to the upper frame. The tube is shaped such that, when the inlet and the outlet are mounted on opposite sides of the lower frame of a motorcycle, the tube extends outwardly from each side of the frame, then extends upwardly (vertically), and then extends horizontally inwardly to join and form an enclosed passageway. The tube preferably has an overall width of about thirty inches and an overall height of about eighteen inches.

The tube preferably has an outside diameter of about 1.25 inch, an inside diameter of about 1.0 inch, and an interior cross-sectional area of about 0.8 square inches. The interior of the tube has two to four, preferably two, cross-sectional restrictions 17 that increase the pressure of the oil. Each restriction preferably has a cross-sectional area at its most restricted point that is equal to about 5 to 50 percent, more preferably about 10 to 20 percent, of the unrestricted cross-sectional area within the tube. In the preferred embodiment, each of the two restrictions has a minimum diameter of 0.375 inches, giving them a cross-sectional area of 0.11 square inches that is about 14 percent of the unrestricted cross-sectional area of the tube.

Each restriction is preferably formed by an inwardly-sloping member located around the inside circumference of the tube that gradually restricts the cross-sectional area to the minimum point and then expands at a right angle back to the unrestricted cross-sectional area. The inlet and the outlet of the tube generally contain reduced cross-sectional areas, but they are not considered restrictions for the purposes of this invention.

The exterior of the engine guard oil cooler contains two to four, preferably two, sets of radial cooling fins 18. The fins increase the surface area for heat exchange and thus dramatically improve the cooling of the oil as it flows through the engine guard oil cooler. Each set of fins preferably contains about twenty fins. Each fin preferably has an outside diameter of two inches and a thickness of 0.08 inches. A gap of 0.12 inches preferably exists between adjacent fins. The fins are preferably located on the vertical portions of the tube (the portions extending upward). This location is ideal for maximum air flow pass the fins. Furthermore, this location does not interfere with air flow to the engine and is less prone to damage from road debris.

The cross-sectional restrictions and the fins are preferably located at the same point of the tube for ease of manufacturing. The restrictions are most preferably located at the downstream end of the fins, as shown in FIG. 2. This location maximizes cooling and also simplifies manufacture. A fitting containing the restrictions and the fins is typically manufactured separately and then connected to conventional tubing at the desired location.

The inlet of the engine guard oil cooler communicates with the oil reservoir through inlet hose 20. One end of the inlet hose is attached to the inlet of the cooler and the other end of the hose is attached to the outlet port of an oil cooler adapter. Oil cooler adapters for motorcycle engines are conventional. They fit onto the oil filter mounting bracket and provide a new oil filter mounting bracket as well as ports for an auxiliary oil cooler. The outlet of the engine guard oil cooler communicates with the oil reservoir through outlet hose 21. One end of the outlet hose is attached to the outlet of the cooler and the other end is attached to the inlet port of the oil cooler adapter.

The addition of the engine guard oil cooler of this invention adds about one quart of additional capacity to the oil reservoir. The additional capacity increases the life of the oil and promotes engine longevity. The internal restrictions create additional oil pressure. The increase is up to about twelve pounds per square inch (psi) when cold and up to about five psi when hot. The internal restrictions also provide pressure decreases that, while not wishing to be bound by theory, are believed to provide additional cooling. The combination of the internal restrictions and the radial cooling fins can decrease the oil temperature by as much as 40° F. As previously mentioned, the oil cooler is located to receive maximum air flow and to minimize the obstruction of air flow to the engine.

What is claimed is:

1. An integrated motorcycle engine guard oil cooler comprising a hollow metal tube having an inlet; an outlet; a length; an interior; an exterior; and a shape such that, when the inlet and the outlet are mounted on opposite sides of a lower frame of a motorcycle, the tube extends outwardly from each side of the frame, then extends upwardly, and then extends inwardly to join and form an enclosed passageway; the tube further having an unrestricted cross-sectional area along substantially all of the length of its interior; two to four cross-sectional restrictions in its interior located in the upwardly extending, vertical portions of the tube, each restriction having a cross-sectional area of about 5 to 50 percent of the unrestricted cross-sectional area of the tube and being formed by an inwardly-sloping member located around the inside circumference of the tube that gradually restricts the cross-sectional area to a minimum point and then expands at a right angle back to the unrestricted cross-sectional area; and radial cooling fins on its exterior at each cross-sectional restriction; such that when the inlet and the outlet communicate with an oil reservoir of the engine, oil flows through the tube with successive pressure increases and pressure decreases as it passes the cross-sectional restrictions and heat from the oil is transferred to ambient air through the radial cooling fins.

2. The engine guard oil cooler of claim 1 wherein the restrictions have a cross-sectional area of about 10 to 20 percent of the unrestricted cross-sectional area of the tube.

\* \* \* \* \*